United States Patent Office 2,764,608
Patented Sept. 25, 1956

2,764,608
DIHALOCYANOVINYL BENZOATES

Etcyl H. Blair, Midland, Mich., assignor to The Dow Chemical Company, Midland, Mich., a corporation of Delaware No Drawing. Application May 19, 1954,
Serial No. 430,993

8 Claims. (Cl. 260—465)

The present invention is concerned with dihalocyanovinyl benzoates having the formula

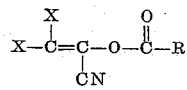

In this and succeeding formulae, X represents halogen and R represents a non-acidic homocyclic aromatic radical. The term "non-acidic homocyclic aromatic radical" is intended to be construed herein as inclusive of such radicals as phenyl, phenyl-phenyl, halophenyl, cyclohexylphenyl, nitrophenyl, alkylphenyl, alkoxyphenyl, haloalkylphenyl, halonitrophenyl and the like.

The new ester compounds are crystalline solids somewhat soluble in many common organic solvents and of very low solubility in water. They have been found to be thermally stable at temperatures up to and somewhat above their melting points. The compounds are particularly useful as anthelmintics for the control of animal parasites such as coccidia and worms. They have also been found valuable as bactericides and fungicides and are adapted to be employed as active toxic constituents of compositions for the control of bacterial and fungal organisms.

The new dihalocyanovinyl benzoates may be prepared by mixing or otherwise blending a trihalocyanoethyl benzoate of the formula

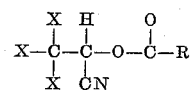

with pyridine to effect a dehydrohalogenation reaction from which results the desired ester. The reaction conveniently may be carried out in an inert organic solvent such as carbon tetrachloride and benzene. Good results are obtained when one or more molecular proportions of pyridine are reacted with one molecular proportion of the trihalocyanoethyl ester reagent. A smaller proportion of the pyridine reactant may be employed but is undesirable from the standpoint of economy, since it results in reduced yields of the desired products. The reaction is somewhat exothermic and takes place smoothly at temperatures of from 10 to 90° C. The temperature may be controlled by regulating the rate of contacting the reactants and/or by the addition or subtraction of heat, as desired. Upon completion of the reaction, the desired product may be separated by conventional methods, e. g. washing with water, filtration, decantation and evaporation of the reaction solvent.

The trihalocyanoethyl esters, employed as starting materials in the aforedescribed process, are crystalline solids or viscous liquids which are somewhat soluble in many organic solvents and of very low solubility in water. They may be produced by several methods. One such procedure comprises mixing together (1) chloral cyanohydrin or bromal cyanohydrin and (2) a benzoyl halide of the formula

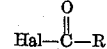

at a reaction temperature at which hydrogen halide of reaction is formed from the carbonyl halogen of the benzoyl halide and the hydroxyl hydrogen of the cyanohydrin reagent. The reaction conveniently may be carried out in an inert organic solvent such as toluene, chlorobenzene and dichlorobenzene. Good results are obtained when substantially equimolecular proportions of the reactants are employed. The reaction proceeds smoothly with the formation of the desired product and halogen halide of reaction at temperatures of from 100° to 210° C. depending upon which ester is being prepared. Where it is desired to prepare the ester of benzoic acid or of the halo-, alkyl- and alkoxy-benzoic acids, the reaction takes place readily at temperatures of from 100° to 210° C. In the preparation of the other benzoic acid esters, temperatures in the range of from 150° to 210° C. are generally required. In carrying out the reaction, substantially all of the carbonyl halogen of the benzoyl halide reactant may be recovered as hydrogen halide. Following the reaction, the desired trihalocyanoethyl benzoates may be separated by conventional methods, e. g. extraction with an organic solvent, washing with water and dilute aqueous alkali metal carbonate, filtration, decantation and evaporation of reaction solvent. Certain of the trihalocyanoethyl ester starting materials constitute the subject matter of my copending application, Serial No. 430,994, filed concurrently herewith.

In carrying out the method of the present invention, it has been found unnecessary to isolate the trihalocyanoethyl benzoates to be employed as starting materials. Thus, the process may be carried out by mixing or otherwise blending together (1) chloral cyanohydrin or bromal cyanohydrin, (2) pyridine and (3) a benzoyl halide of the formula

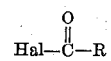

at a temperature at which hydrogen halide of reaction is formed. This hydrogen halide of reaction appears in the reaction mixture as pyridine hydrohalide. The reaction is somewhat exothermic and proceeds smoothly at temperatures of from 10° to 90° C. with the formation of the desired product and hydrogen halide of reaction. Good results are obtained when one or more molecular proportions of pyridine are reacted with one molecular proportion of cyanohydrin and one molecular proportion of the acid chloride. Optimum yields are obtained when at least two molecular proportions of pyridine is reacted with one molecular proportion of each of the other reagents. When employing such proportions, substantially two moles of pyridine hydrohalide may be recovered for each mole of employed benzoyl halide or cyanohydrin reagent. In carrying out the reaction, the reagents may be contacted in any convenient fashion. In a preferred method of operation, the pyridine is added to a mixture of the other two reagents under suitable conditions of temperature in the reaction vessel. Following the reaction, the desired product may be separated as previously described.

The following examples illustrate the invention but are not to be construed as limiting:

*Example 1.*—*2,2-dichloro-1-cyanovinyl 4-chlorobenzoate*

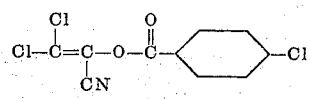

26.3 grams (0.33 mole) of pyridine was added portionwise with stirring and cooling to 104 grams (0.33 mole) of 2,2,2-trichloro-1-cyanoethyl 4-chlorobenzoate (melting at 100°–101° C.) dissolved in 600 milliliters of benzene. During the addition a white precipitate of pyridine hydrochloride formed in the reaction mixture. Following the addition, the reaction mixture was heated for one-half hour at the boiling temperature (82° C.), and under reflux to complete the reaction. The mixture was then filtered to separate pyridine hydrochloride and the filtrate distilled under reduced pressure to recover the reaction solvent. As a result of these operations, there was obtained a 2,2-dichloro-1-cyanovinyl 4-chlorobenzoate product as a crystalline residue. The latter was recrystallized from isopropyl alcohol and found to melt at 91°–92° C.

*Example 2.—2,2-dichloro-1-cyanovinyl 4-chlorobenzoate*

48.1 grams (0.28 mole) of chloral cyanohydrin and 40 grams (0.58 mole) of pyridine were dispersed in 100 milliliters of chloroform and 43.8 grams (0.25 mole) of 4-chlorobenzoyl chloride added portionwise thereto with stirring and cooling. Following the addition, 50 milliliters of chloroform was added to the reaction zone and was accompanied by the formation of crystals of pyridine hydrochloride. The mixture was then heated for four hours at the boiling temperature and under reflux to complete the reaction. The reaction mixture was then cooled to room temperature and thereafter successively washed with water, dilute aqueous sodium carbonate and water. Following removal of the solvent by evaporation, a 2,2-dichloro-1-cyanovinyl 4-chlorobenzoate product was obtained as a crystalline solid. The latter product was recrystallized from methanol and found to have a chlorine content of 38.16 percent and a nitrogen content of 5.07 percent.

*Example 3.—2,2-dichloro-1-cyanovinyl 4-nitrobenzoate*

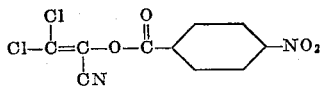

96.2 grams (0.55 mole) of chloral cyanohydrin, 92.8 grams (0.5 mole) of 4-nitrobenzoyl chloride and 39.6 grams (0.5 mole) of pyridine were dispersed in 200 milliliters of chloroform and the resulting mixture heated for 5 hours at the boiling temperature and under reflux. During the reaction a 2,2-dichloro-1-cyanovinyl 4-nitrobenzoate product precipitated in the reaction mixture as a crystalline solid. The latter was separated by filtration, washed with chloroform and twice recrystallized from chloroform. The recrystallized product melted at 145°–146° C. and had a chlorine content of 24.74 percent and a nitrogen content of 9.74 percent.

*Example 4.—2,2-dibromo-1-cyanovinyl benzoate*

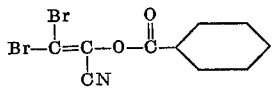

25 grams (0.061 mole) of 2,2,2-tribromo-1-cyanoethyl benzoate (melting at 86°–87° C.) and 4.4 grams (0.056 mole) of pyridine were dissolved in 100 milliliters of benzene and the resulting mixture set aside at room temperature for 18 hours to complete the reaction. The reaction mixture was then successively washed with water, dilute aqueous hydrochloric acid and finally again with water. Following the removal of the benzene by evaporation, a 2,2-dibromo-1-cyanovinyl benzoate product was obtained as a crystalline residue. The latter was recrystallized from isopropyl alcohol and found to melt at 66°–67° C. and have a bromine content of 48.37 percent and a nitrogen content of 4.25 percent.

*Example 5.—2,2-dichloro-1-cyanovinyl 4-ethoxybenzoate*

0.7 mole of each of chloral cyanohydrin and 4-ethoxybenzoyl chloride and 1.4 moles of pyridine were dispersed in 420 milliliters of chloroform and the resulting mixture heated for 6 hours at the boiling temperature and under reflux. The reaction mixture was then successively washed with water and dilute aqueous sodium carbonate. Following the removal of the benzene by evaporation, a 2,2-dichloro-1-cyanovinyl 4-ethoxylbenzoate product was obtained as a crystalline residue. The latter product was twice recrystallized from methanol and found to melt at 96°–97° C. and have a chlorine content of 24.62 percent and a nitrogen content of 4.69 percent.

*Example 6.—2,2-dibromo-1-cyanovinyl 4-chlorobenzoate*

Several milliliters of pyridine were added to 3 grams (0.007 mole) of 2,2,2-tribromo-1-cyanoethyl 4-chlorobenzoate (melting at 137°–138° C.) dissolved in several milliliters of benzene. During the addition a white crystalline material precipitated in the reaction mixture. Following the addition, the reaction mixture was successively washed with water and dilute aqueous hydrochloric acid. The washed mixture was then fractionally distilled under reduced pressure to separate reaction solvent. As a result of these operations there was obtained a 2,2-dibromo-1-cyanovinyl 4-chlorobenzoate product as a crystalline residue. The latter was recrystallized from petroleum ether (boiling at 60°–70° C.) and found to melt at 107°–108° C.

*Example 7.—2,2-dichloro-1-cyanovinyl 2,4-dichlorobenzoate*

20 grams (0.057 mole) of 2,2,2-trichloro-1-cyanoethyl 2,4-dichlorobenzoate (melting at 79°–80° C.) and 4.6 grams (0.058 mole) of pyridine were dissolved in 100 milliliters of benzene and the resulting mixture set aside at room temperature for 16 hours to complete the reaction. The reaction mixture was then successively washed with water and dilute aqueous hydrochloric acid. Following the removal of the benzene by evaporation, a 2,2-dichloro-1-cyanovinyl 2,4-dichlorobenzoate product was obtained as a crystalline residue. The latter was recrystallized from isopropyl alcohol and found to melt at 92°–93° C. and have a chlorine content of 45.53 percent and a nitrogen content of 4.54 percent.

In a similar manner, other dihalocyanovinyl benzoates may be prepared of which the following are representative.

2,2-dibromo-1-cyanovinyl 2,4,5-trichlorobenzoate by reacting together 2,2,2-tribromo-1-cyanoethyl 2,4,5-trichlorobenzoate and pyridine.

2,2-dibromo-1-cyanovinyl 4-methylbenzoate by reacting together bromal cyanohydrin, 4-methylbenzoyl chloride and pyridine.

2,2-dichloro-1-cyanovinyl 2-butylbenzoate by reacting together chloral cyanohydrin, 2-butylbenzoyl chloride and pyridine.

2,2-dibromo-1-cyanovinyl 4-butoxybenzoate by reacting together bromal cyanohydrin, 4-butoxybenzoyl chloride and pyridine.

2,2-dibromo-1-cyanovinyl 2,4-dinitrobenzoate by reacting together 2,2,2-tribromo-1-cyanoethyl 2,4-dinitrobenzoate and pyridine.

2,2-dichloro-1-cyanovinyl 3-bromobenzoate by reacting together 2,2,2-trichloro-1-cyanoethyl 3-bromobenzoate and pyridine.

2,2-dichloro-1-cyanovinyl 2,4,6-trimethylbenzoate by reacting together chloral cyanohydrin, 2,4,6-trimethylbenzoyl chloride and pyridine.

2,2-dichloro-1-cyanovinyl 2,4-dimethoxybenzoate by reacting together chloral cyanohydrin, 2,4-dimethoxybenzoyl bromide and pyridine.

2,2-dichloro-1-cyanovinyl 2-bromo-4-chlorobenzoate by reacting together 2,2,2-trichloro-1-cyanoethyl 2-bromo-4-chlorobenzoate and pyridine.

2,2-dichloro-1-cyanovinyl 2-cyclohexylbenzoate by reacting together chloral cyanohydrin, 2-cyclohexylbenzoyl chloride and pyridine.

2,2-dibromo-1-cyanovinyl 2-phenylbenzoate by reacting together bromal cyanohydrin, 2-phenylbenzoyl chloride and pyridine.

2,2-dichloro-1-cyanovinyl 4-chloro-2-methylbenzoate by reacting together chloral cyanohydrin, 4-chloro-2-methylbenzoyl bromide and pyridine.

I claim:

1. A compound of the formula

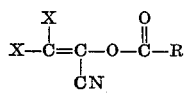

wherein X represents a member of the group consisting of bromine and chlorine and R represents a non-acidic homocyclic aromatic radical.

2. 2,2-dichloro-1-cyanovinyl 4-chlorobenzoate.
3. 2,2-dichloro-1-cyanovinyl 4-nitrobenzoate.
4. 2,2-dibromo-1-cyanovinyl 4-chlorobenzoate.
5. 2,2-dibromo-1-cyanovinyl benzoate.
6. 2,2-dichloro-1-cyanovinyl 2,4-dichlorobenzoate.
7. A process for the manufacture of a compound having the formula

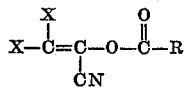

wherein X represents a member of the group consisting of chlorine and bromine and R represents a non-acidic homocyclic aromatic radical, which comprises mixing together at a temperature of from 10° to 90° C. (1) pyridine and (2) a compound of the formula

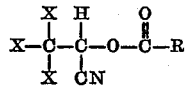

wherein X and R are as defined above.

8. A process for the manufacture of a compound having the formula

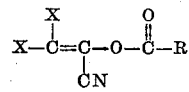

wherein X represents a member of the group consisting of chlorine and bromine and R represents a non-acidic homocyclic aromatic radical, which comprises mixing together at a temperature of from 10° to 90° C. (1) pyridine (2) a member of the group consisting of bromal cyanohydrin and chloral cyanohydrin and (3) a benzoyl halide of the formula

wherein Y represents a member of the group consisting of bromine and chlorine and R is as defined above.

References Cited in the file of this patent

UNITED STATES PATENTS

| | | |
|---|---|---|
| 2,311,898 | Lichty | Feb. 23, 1943 |
| 2,326,373 | Long | Aug. 10, 1943 |
| 2,394,520 | Lichty | Feb. 5, 1946 |
| 2,467,373 | Dutcher et al. | Apr. 19, 1949 |

OTHER REFERENCES

Deodhar: Chem. Abst., vol. 28, col. 4037 (1934).